United States Patent
Huang et al.

(10) Patent No.: US 10,303,657 B2
(45) Date of Patent: May 28, 2019

(54) DOCKER LAYER DEDUPLICATION WITH LAYER REFERENCING

(71) Applicant: International Business Machines Corporation, Armonk, NY (US)

(72) Inventors: Dan Qing Huang, Beijing (CN); Zi Wen Li, Beijing (CN); Chih-Hong Wong, Beijing (CN); Juan Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 15/283,172

(22) Filed: Sep. 30, 2016

(65) Prior Publication Data

US 2018/0095973 A1  Apr. 5, 2018

(51) Int. Cl.
*G06F 17/00* (2019.01)
*G06F 16/174* (2019.01)
*G06F 8/61* (2018.01)

(52) U.S. Cl.
CPC ............ *G06F 16/1748* (2019.01); *G06F 8/63* (2013.01)

(58) Field of Classification Search
CPC ............... G06F 17/30073; G06F 17/30; G06F 17/30156; G06F 16/1748; G06F 8/63
USPC .................................................. 707/600–899
See application file for complete search history.

(56) References Cited

U.S. PATENT DOCUMENTS

2004/0153478 A1* 8/2004 Igouchkine ............. G06F 8/658

FOREIGN PATENT DOCUMENTS

CN  104809025 A  7/2015
WO  2015126292 A1  8/2015

OTHER PUBLICATIONS

Boettiger, Carl, "An introduction to Docker for Reproducible research, with examples from the R environment", arXiv:1410.0846[cs]. Oct. 2, 2014, 9 pages <https://arxiv.org/pdf/1410.0846.pdf>.
Felter, W. et al., IBM Research Report, "An Updated Performance Comparison of Virtual Machines and Linux Containers", RC25482 (AUS1407-001) , Jul. 21, 2014, 12 pages. <http://domino.research.ibm.com/library/cyberdig.nsf/papers/0929052195DD819C85257D2300681E7B/$File/rc25482.pdf>.
Bogosian, Matt, "dimgx Documentation, Release 0.1.5 ", © 2015 Matt Bogosian (@posita), May 19, 2015, 19 pages <https://media.readthedocs.org/pdf/dimgx/v0.1.5/dimgx.pdf>.
Docker, Inc. "Docker and the Device Mapper storage driver", © 2016, retrieved Sep. 28, 2016, 21 pages <http://docs.master.dockerproject.org/engine/userguide/storagedriver/device-mapper-driver/>.

* cited by examiner

*Primary Examiner* — Isaac M Woo
(74) *Attorney, Agent, or Firm* — Patterson + Sheridan, LLP

(57) ABSTRACT

According to embodiments of the present disclosure, a method, a device and a computer program product for layer deduplication are provided. The method comprises obtaining a first image generated for a first container, the first image including a plurality of layers associated with the first container. The method further comprises in response to determining that a first layer in the first image is identical to a second layer to be created, creating the second layer by generating a data archive associated with the first layer. In addition, the method comprises generating, based on the created second layer, a second image for a second container.

10 Claims, 4 Drawing Sheets

DOCKER LAYER DEDUPLICATION WITH LAYER REFERENCING

BACKGROUND

Docker is an open platform for developing, shipping, and running applications. At its core, Docker provides a way to run almost any application securely isolated in a container. A container may consist of an application, user-added files, and metadata for an application. Each container is built from an image, which may specify what the container holds, what process to run when the container is launched, and a variety of other configuration data. The image is a read-only template from which the container is launched. The image may consist of a series of layers. When an image needs to be changed (for example, an application needs to be updated to a new version), a new layer may get built. Rather than replacing or entirely rebuilding the whole image as may be done with a virtual machine, only that layer needs to be added or updated.

An image may start from a base image, such as a base Ubuntu image or a base Fedora image. Further, images generated for one container can be used as the basis for new images for another container. For example, if a base Apache image has been generated, it can be used as the base image for all web applications. An image can be built from these base images using a set of instructions, each of which creates a new layer in the image. However, because these layers within the image are overlays in a single inheritance tree, duplicated layers may be inevitably introduced while the image is being built. In addition, such layer duplication cannot be eliminated simply by writing the set of instructions carefully or merging multiple layers into one layer. Similar problems exist for other containerization technologies such as Chroot, Linux-VServer, LXC, and so on.

SUMMARY

In general, example embodiments of the present disclosure include a method, device and computer program product for layer deduplication.

One embodiment of the present disclosure provides a computer-implemented method. The method comprises obtaining a first image that is generated for a first container and is a base image for a second image to be generated for a second container, the first image including a plurality of layers. The method further comprises, in response to determining a second layer to be created for the second image is identical to a first layer of the plurality of layers in the first image, creating the second layer by generating a data archive associated with the first layer. In addition, the method comprises generating the second image for the second container based on the created second layer.

In another embodiment of the present disclosure, a device is provided. The device comprises a processing unit and a tangible storage medium having instructions stored thereon for execution by the processing unit. The instructions, when executed by the processing unit, cause the device to perform actions including: obtaining a first image that is generated for a first container and is a base image for a second image to be generated for a second container, the first image including a plurality of layers; in response to determining a second layer to be created for the second image is identical to a first layer of the plurality of layers in the first image, creating the second layer by generating a data archive associated with the first layer; and generating the second image for the second container based on the created second layer.

Yet another embodiment of the present disclosure provides a computer program product comprising a computer readable storage medium having computer readable program instructions embodied therewith that, when executed by operation of one or more computer processors, perform an operation comprising obtaining a first image that is generated for a first container and is a base image for a second image to be generated for a second container, the first image including a plurality of layers; in response to determining a second layer to be created for the second image is identical to a first layer of the plurality of layers in the first image, creating the second layer by generating a data archive associated with the first layer; and generating the second image for the second container based on the created second layer.

It is to be understood that the summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure and the accompanying drawings, the above and other objects, features and advantages of the present disclosure will become more apparent, wherein.

Throughout the drawings, the same or similar reference numerals represent the same or similar element.

DETAILED DESCRIPTION

The present disclosure will now be described with reference to some example embodiments. It is to be understood that these embodiments are described only for the purpose of illustration and to help those skilled in the art to understand and implement the present disclosure, without suggesting any limitations as to the scope of the disclosure. The disclosure described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
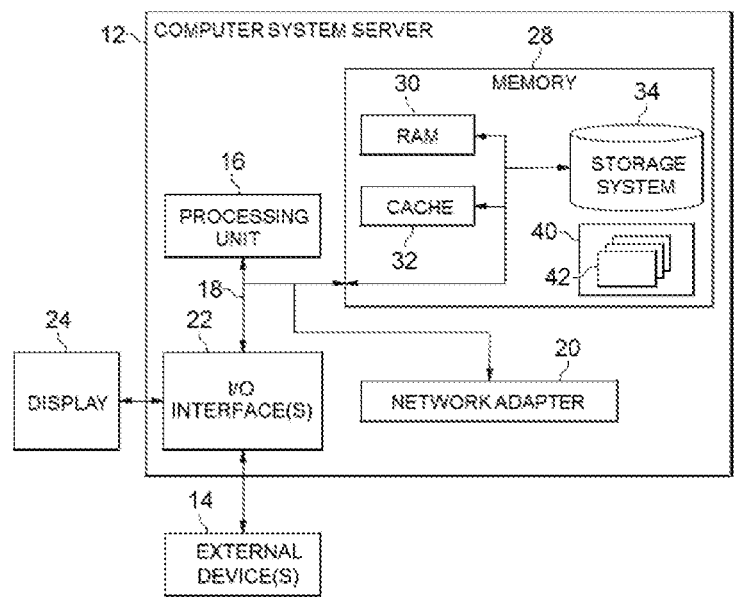
FIG. 1 is a block diagram of an electronic device in which one embodiment of the present disclosure can be implemented.

Reference is first made to FIG. 1, in which an exemplary electronic device or computer system server 12 which is capable of implementing one embodiment of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, and removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may communicate with one or more external devices 14 such as a keyboard, a pointing device, a display 24, and the like. Computer system server 12 may also communicate with one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such as a keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Figure 2:
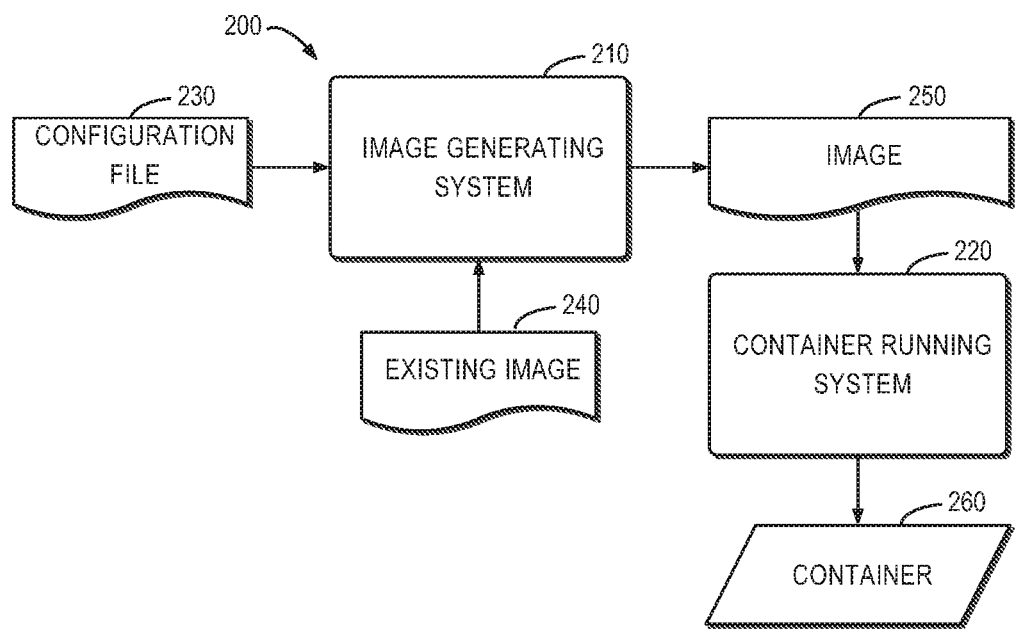
FIG. 2 shows an environment 200 in which an embodiment of the present disclosure can be implemented.

FIG. 2 shows an environment 200 in which one embodiment of the present disclosure can be implemented. It is to be understood that the structure and functionality of the environment 200 are described only for the purpose of illustration without suggesting any limitations as to the scope of the present disclosure. The embodiments of the present disclosure can be embodied with a different structure and/or functionality.

As illustrated in FIG. 2, the environment 200 may generally comprise an image generating system 210 and a container running system 220. The image generating system 210 and/or the container running system 220 may be implemented by computer system/server 12 as discussed with reference to FIG. 1, for example. Some embodiments of the present disclosure may include two phases: an image generating phase and a container running phase.

During the image generating phase, the image generating system 210 may be configured to generate an image 250 based on a configuration file 230 and an existing image 240. As described above, an image can be built from a base image using a set of instructions. The base images may be contained in the existing image 240, and these instructions may be stored in the configuration file 230 (also called a "Dockerfile" in Docker). For example, the configuration file 230 may be a text-based script that contains instructions for generating the image 250. The image generating system 210 may read the configuration file 230 when the generation of the image 250 is requested, execute the instructions, and return the generated image 250.

Specifically, each of the instructions in the configuration file 230 may be executed step-by-step. In execution of each of the instructions, an intermediate container may be created so that the instruction is run inside the intermediate container. In this way, the intermediate container may contain all changes that need to be made to the underlying layers. Then a copy of the intermediate container is committed to an image. After all the instructions have been executed, all of the intermediate containers can be removed and the image 250 will be left. During the container running phase, the container running system 220 may be configured to read the image 250 to run a container 260.

Figure 3:
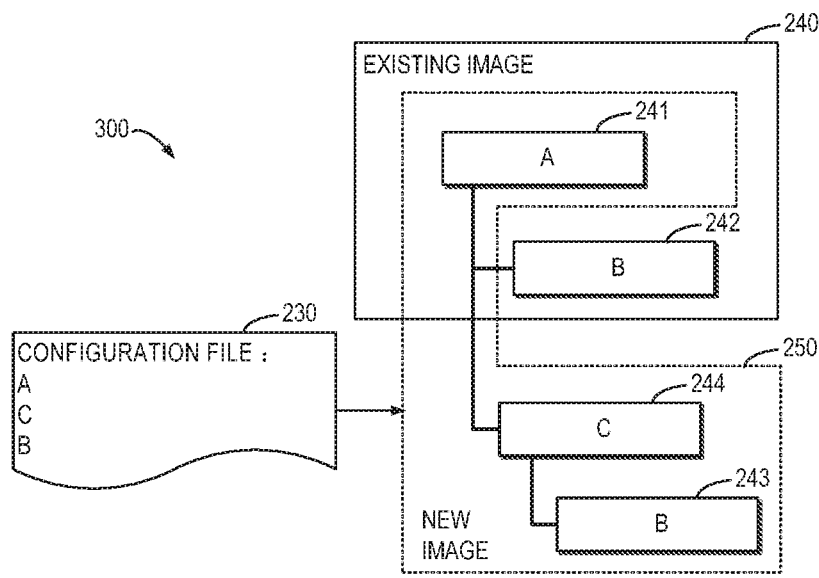
FIG. 3 shows an example of layer duplication in accordance with conventional solutions.

As described above, each of the instructions stored in the configuration file 230 may create a layer in the image 250. Sometimes a layer to be created in the image 250 might have already existed in the existing image 240. In conventional solutions, duplicated layers will be introduced during the image generating phase because the layers within the image are overlays in a single inheritance tree. For example, FIG. 3 shows an example of layer duplication in accordance with conventional solutions. As shown in FIG. 3, the existing image 240 includes Layer A 241 and Layer B 242, where Layer A 241 is assumed to be created prior to Layer B 242. The instructions stored in the configuration file 230 indicate that the layers to be created in sequence in the image 250 are Layer A, Layer C and Layer B. Due to the single-inheritance layering model, the image 250 will share Layer A 241 with the existing image 240, but a new copy of Layer B will be created in the image 250. That is because the base layer of Layer B 243 in the image 250 is Layer C 244, which is different from the base layer of Layer B 242 in the existing image 240. As a result, two copies of Layer B will be created, which may cause a waste of disk space.

In order to solve the above and other potential problems, a solution for layer deduplication is provided in accordance with example embodiments of the present disclosure. The layer deduplication may be performed with layer referencing during the image generating phase. Specifically, the layer deduplication can be achieved by enabling a recurring layer (such as Layer B 243) to refer to the content of the original layer (such as Layer B 242). That is, in accordance with embodiments of the present disclosure, if it is determined that a layer to be created for a new container is already present in an existing container, this layer can be "reused" without repeating the creation process, thereby improving the efficiency of container generation.

Figure 4:
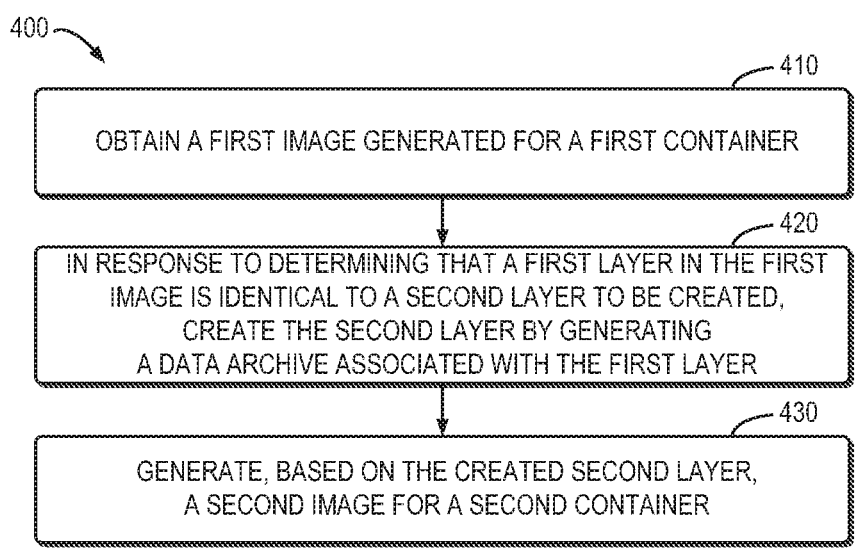
FIG. 4 is a flowchart of a method 400 for layer deduplication in accordance with one embodiment of the present disclosure.

An example embodiment of the present disclosure will be discussed with reference to FIG. 4 which shows a flowchart of a method 400 for layer deduplication in accordance with one embodiment of the present disclosure. The method 400 will be described in connection with the environment 200 shown in FIG. 2 and the example shown in FIG. 3. For example, in some embodiments, the method 300 may be performed by the image generating system 210. Only for the purpose of illustration, in the following discussions, the existing image 240 in FIG. 2 is referred to as the "first image" and the image 250 is referred to as the "second image." The container corresponding to the existing image 240 (not shown in FIG. 2) is referred to as the "first container" and the container 260 in FIG. 2 is referred to as the "second container." The Layer B 242 in the existing image 240 as shown in FIG. 3 is referred to as the "first layer." The Layer B 243 in the image 250 as shown in FIG. 3 is referred to as the "second layer", and the Layer C 244 in the image 250 is referred to as the "third layer."

The method 400 is entered in step 410. In this step, in response to a request to create or generate a new image, the image generating system 210 obtains an existing image(s). For the sake of discussion, the existing image is referred to "a first image" and the image to be generated is referred to "a second image." The containers including the first and second images are referred to as first and second containers, respectively. In FIG. 2, the image 240 is the first image. The first image 240 may include a plurality of layers associated with the first container. Still in reference to the example as shown in FIG. 3, the first image 240 may include the Layer A 241 and the Layer B 242 which is created after the Layer A 241. For example, the image generating system 210 may obtain the first image 240 generated for the first container from a local image repository. Moreover, the image generating system 210 may also determine from the first image 240 the plurality of layers it contains.

Then, the method 400 proceeds to step 420. If it is determined that a first layer in the first image 240 is identical to a second layer to be created in the second image, the image generating system 210 creates the second layer by generating a data archive associated with the first layer. For example, in some embodiments, the image generating system 210 may determine from the configuration file 230 that the Layer B 243 to be created is identical to the Layer B 242 in the first image 240. In this case, instead of creating an entire copy of Layer B 242 as may be done with the existing solutions, the image generating system 210 may generate a data archive associated with the first layer (that is, the Layer B 242 in the first image 240).

Figure 5:
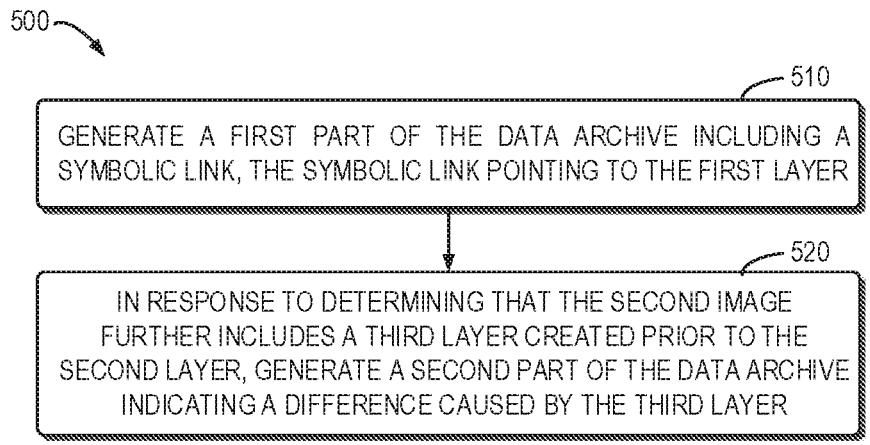
FIG. 5 is a flowchart of a method 500 for generating a data archive associated with the first layer in accordance with an embodiment of the present disclosure.

FIG. 5 illustrates a flowchart of a method 500 for generating a data archive associated with the first layer in accordance with one embodiment of the present disclosure. The method 500 may be regarded as an implementation of the step 420 in the method 400 and may be executed by the image generating system 210 as illustrated in FIG. 2, for example.

In step 510, a first part of the data archive including a symbolic link is generated. The symbolic link points to the first layer. In some embodiments, after the first layer has been created, the image generating system 210 may create a symbolic link which points back to the first layer's data archive. Without creating an entire copy of the first layer's data archive, the disk space can be significantly saved.

However, in some embodiments, because the base layer of the second layer may be different from the base layer of the first layer, content of the first layer in the first image 240 may be different from that of the second layer to be created. In this case, the method 500 may proceed to an additional step 520. In the step 520, if it is determined that a third layer should be created for the second image 250 prior to the second layer, the image generating system 210 generates a second part of the data archive indicating a difference caused by the third layer. Still in reference to the example as shown in FIG. 3, the image generating system 210 may determine from the configuration file 230 that the Layer C 244 should be created prior to the Layer B 243 for the second image 250. In this case, the image generating system 210 may generate the second part of the data archive to keep the side effects introduced by the Layer C 244.

In some embodiments, this can be done by utilizing features of a file system, such as the file system of a Docker container. In the following discussions, the principle and idea of embodiments of the present disclosure are mainly illustrated in conjunction with Docker. It is to be understood that this is only for the purpose of illustration without suggesting any limitations as to the scope of the present disclosure. Examples of other containerization technology include, but are not limited to, Chroot, Linux-VServer, LXC, and the like.

Each Docker image may reference a list of read-only layers that represent file system differences. These layers are stacked on top of each other to form a base for a container's root file system. When a new image for a container is being created, a new, thin and writable layer may be added on top of the underlying stack. This layer is often called the "container layer." All changes made to the underlying read-only layers, such as writing new files, modifying existing files, and deleting files, are written to this thin writable container layer. When an existing file in the underlying read-only layers is modified, Docker may use a storage driver to perform a copy-on-write operation. The specific actions of the copy-on-write operation depend on the storage driver. For the Another Union File System (AUFS, the default storage driver in Docker), the copy-on-write operation may be performed as follows: searching through the image layers for the file to update, where the searching process may start at the top, newest layer and work down to the base layer one layer at a time. Then a "copy-up" operation may be performed on the first copy of the file that is found, where the "copy-up" operation copies the file up to the thin writable container layer. Next, the copy of the file in the thin writable container layer is modified. With this arrangement, the second part of the data archive can be generated by monitoring the "copy-up" event.

Figure 6:
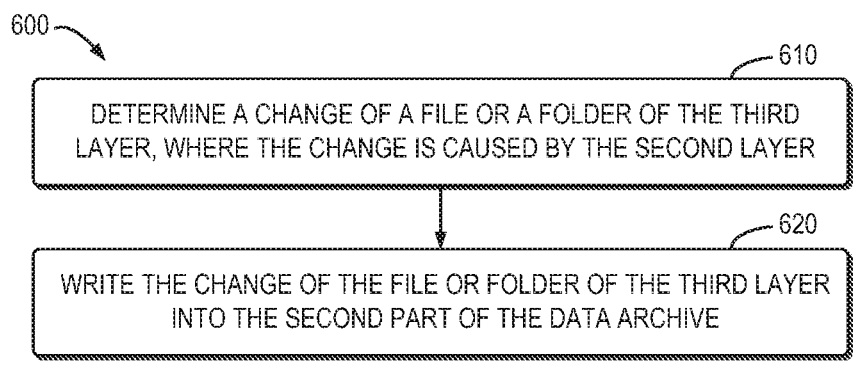
FIG. 6 is a flowchart of a method 600 for generating the second part of the data archive in accordance with one embodiment of the present disclosure.

FIG. 6 shows a flowchart of a method 600 for generating the second part of the data archive in accordance with one embodiment of the present disclosure. In step 610, a change of a file or a folder of the third layer is determined, where the change is caused by the second layer. In some embodiments, the change can be determined by monitoring an event such as the "copy-up" event on a file system, for example. As described above, in execution of the instruction for creating the second layer (that is, Layer B 243), an intermediate container can be created which may contain all changes that need to be made to the underlying layers. Therefore, the "copy-up" event on the file system of this intermediate container can be monitored to determine the change of a file or folder of the third layer caused by the second layer. In some embodiments, the "copy-up" event can be monitored by modifying source code of the file system (for example, the file "cpup.c" for the AUFS in Docker). Alternatively, or in addition, the monitoring may only occur during the image generating phase to reduce the performance impact. Then, in step 620, the change of the file or folder of the third layer is written into the second part of the data archive.

It is to be understood that the change in the third layer caused by the second layer can be determined in other suitable manners. For example, in addition to or instead of monitoring the system event, it is possible to determine the change by periodically checking the status of the third layer, and/or by receiving a message indicating the change.

It is also to be understood that in addition to the first and/or second part, the data archive associated with the first layer may include any other information on the first layer. For example, the data archive may also include the information related to the third layer C 244 (if any) which is to be created prior to the second layer B 243.

In addition to generating the data archive associated with the first layer, the creation of the second layer may also comprise generating metadata associated with the second layer. The metadata may include a checksum, a description file, layer size of the second layer and so on. The checksum may contain a cryptographic hash of contents of the second layer's data archive. The description file may be in JavaScript Object Notation (JSON) format, which may describe some basic information about the second layer such as date created, author, and the identifier of its parent image, as well as runtime configuration like its entry point, default arguments, Central Processing Unit (CPU) or memory shares, networking, and volumes.

Referring back to FIG. 4, the method 400 proceeds to step 430, where a second image for a second container is generated based on the created second layer. In the example as shown in FIG. 3, the instructions stored in the configuration file 230 indicate that the layers to be created in sequence in the image 250 are the Layer A, the Layer C and the Layer B. After the Layer B 243 is created, all of the instructions stored in the configuration file 230 have been executed. The image 250 can thus be generated.

Figure 7:
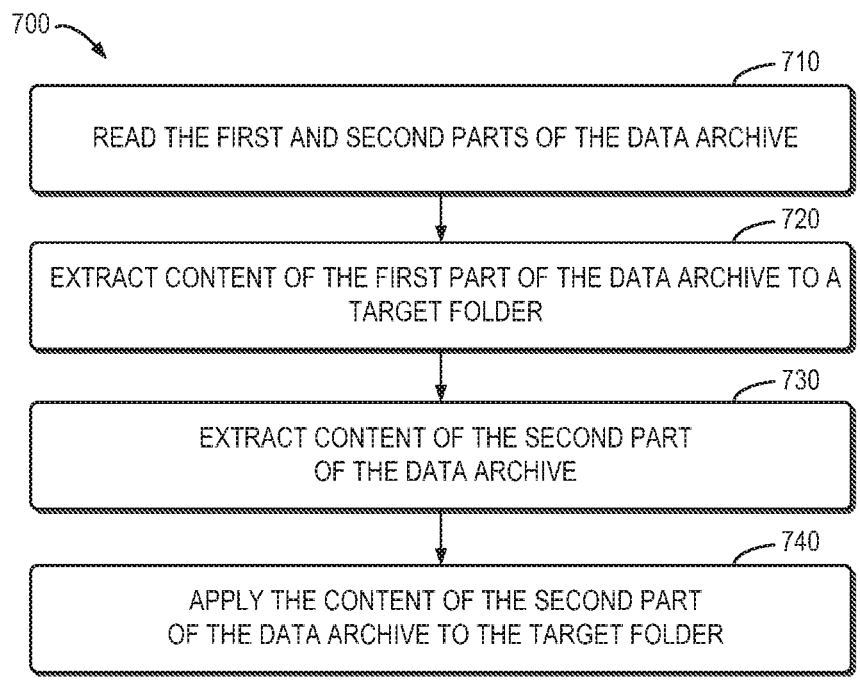
FIG. 7 is a flowchart of a method 700 for reading the second image in accordance with one embodiment of the present disclosure.

In some embodiments, the generated image 250 may then be read by the container running system 220 to run the second container 260. Specifically, the container running system 220 may read and extract data archives associated with each of the plurality of layers in the image 250. FIG. 7 shows a flowchart of a method 700 for reading the data archive associated with the second layer in accordance with one embodiment of the present disclosure. The method 700 will be described in connection with the environment 200 shown in FIG. 2 and the example shown in FIG. 3. For example, in some embodiments, the method 700 may be executed by the container running system 220 as illustrated in FIG. 2.

In step 710, the container running system 220 reads the first and second parts of the data archive associated with the second layer. Then, in step 720, the content of the first part of the data archive is extracted by the container running system 220 to a target folder. Because the content of the first part of the data archive includes the symbolic link to the first layer, the content of the data archive of the first layer may be extracted to the target folder. The method 700 then proceeds to step 730, where the container running system 220 further extracts the content of the second part of the data archive. In step 740, the content of the second part of the data archive is applied by the container running system 220 to the target folder. In this way, a state of the second layer can be restored. As described above, the content of the second part of the data archive contains the difference caused by the third layer. Therefore, the difference may overwrite the files or folders in the target fold and the state of the second layer may be restored to its original state in the image generating process.

Through the above descriptions, it will be understood that embodiments of the present disclosure enable a recurring layer to refer to the content of the original layer, such that the disk space can be significantly saved (that is, the layer size of the recurring layer can be greatly reduced). By collecting the "copy-up" events for the recurring layer, the side effects caused by ancestor layers can be preserved. Moreover, the configuration file (such as the "Dockerfile" in Docker) does not need to be changed to achieve such layer deduplication.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining a first image that is generated for a first container, wherein the first image is a base image for a second image to be generated for a second container, and wherein the first image includes a plurality of layers;
    in response to determining a second layer to be created for the second image is identical to a first layer of the plurality of layers in the first image, creating the second layer by generating a data archive associated with the first layer, wherein generating the data archive further comprises:

generating a first part of the data archive that includes a symbolic link pointing to the first layer; and in response to determining that the second image further includes a third layer created prior to the second layer, generating a second part of the data archive indicating a difference caused by the third layer;

generating the second image for the second container based on the created second layer; and reading the second image to run the second container, comprising:

reading the first and second parts of the data archive;

extracting content of the first part of the data archive to a target folder;

extracting content of the second part of the data archive; and applying the content of the second part of the data archive to the target folder.

2. The method of claim 1, wherein generating the second part of the data archive comprises:

determining a change of a file or a folder of the third layer, the change being caused by the second layer; and writing the change of the file or folder of the third layer into the second part of the data archive.

3. The method of claim 1, wherein creating the second layer comprises:

generating metadata associated with the second layer, the metadata including a checksum, a description file, and layer size of the second layer.

4. The method of claim 1, wherein the first and second containers are Docker containers.

5. A device comprising:

a processing unit; and a tangible storage medium having instructions stored thereon for execution by the processing unit, the instructions, when executed by the processing unit, cause the device to perform actions including:

obtaining a first image that is generated for a first container and is a base image for a second image to be generated for a second container, the first image including a plurality of layers;

in response to determining a second layer to be created for the second image is identical to a first layer of the plurality of layers in the first image, creating the second layer by generating a data archive associated with the first layer, wherein generating the data archive further comprises:

generating a first part of the data archive that includes a symbolic link pointing to the first layer; and in response to determining that the second image further includes a third layer created prior to the second layer, generating a second part of the data archive indicating a difference caused by the third layer;

generating the second image for the second container based on the created second layer; and reading the second image to run the second container, comprising:

reading the first and second parts of the data archive;

extracting content of the first part of the data archive to a target folder;

extracting content of the second part of the data archive; and applying the content of the second part of the data archive to the target folder.

6. The device of claim 5, wherein generating the second part of the data archive comprises:

determining a change of a file or a folder of the third layer, the change being caused by the second layer; and writing the change of the file or folder of the third layer into the second part of the data archive.

7. The device of claim 5, wherein creating the second layer comprises:

generating metadata associated with the second layer, the metadata including a checksum, a description file, and layer size of the second layer.

8. The device of claim 5, wherein the first and second containers are Docker containers.

9. A computer program product comprising a computer readable storage medium having computer readable program instructions embodied therewith that, when executed by operation of one or more computer processors, perform an operation comprising:

obtaining a first image that is generated for a first container and is a base image for a second image to be generated for a second container, the first image including a plurality of layers;

in response to determining a second layer to be created for the second image is identical to a first layer of the plurality of layers in the first image, creating the second layer by generating a data archive associated with the first layer, wherein generating the data archive further comprises:

generating a first part of the data archive that includes a symbolic link pointing to the first layer; and in response to determining that the second image further includes a third layer created prior to the second layer, generating a second part of the data archive indicating a difference caused by the third layer;

generating the second image for the second container based on the created second layer; and reading the second image to run the second container, comprising:

reading the first and second parts of the data archive;

extracting content of the first part of the data archive to a target folder;

extracting content of the second part of the data archive; and applying the content of the second part of the data archive to the target folder.

10. The computer program product of claim 9, wherein generating the second part of the data archive indicating a difference caused by the third layer determining the change of the file or the folder of the third layer, further comprises:

writing the change of the file or folder of the third layer into the second part of the data archive.

* * * * *